United States Patent
Nishiyama et al.

[11] Patent Number: 5,646,081
[45] Date of Patent: Jul. 8, 1997

[54] NON-REDUCED DIELECTRIC CERAMIC COMPOSITIONS

[75] Inventors: Toshiki Nishiyama, Takefu; Yukio Hamaji, Otsu, both of Japan

[73] Assignee: Murata Manufacturing Co., Ltd., Japan

[21] Appl. No.: 631,699

[22] Filed: Apr. 9, 1996

[30] Foreign Application Priority Data

Apr. 12, 1995 [JP] Japan .................. 7-087135

[51] Int. Cl.$^6$ .................. C04B 35/468
[52] U.S. Cl. .................. 501/138; 501/139; 361/320
[58] Field of Search .................. 501/138, 139, 501/32; 361/320

[56] References Cited

U.S. PATENT DOCUMENTS 5,248,640  9/1993  Sano et al. .................. 501/139
5,268,342  12/1993  Nishiyama et al. .................. 501/139
5,397,753  3/1995  Nishiyama et al. .................. 501/139

*Primary Examiner*—Karl Group
*Attorney, Agent, or Firm*—Ostrolenk, Faber, Gerb & Soffen, LLP

[57] ABSTRACT

This invention is directed to provide a non-reduced dielectric ceramic composition, which comprises a main component comprising $BaTiO_3$, at least one rare earth metal oxide ($Re_2O_3$) selected from the group consisting of $Tb_2O_3$, $Dy_2O_3$, $Ho_2O_3$, and $Er_2O_3$, and $Co_2O_3$, where such constituents are contained at a predetermined formulation in the main component, an sub-component comprising BaO, MnO, MgO, and at least one compound selected from the group of NiO and $Al_2O_3$, and an oxide glass mainly containing $Li_2O$—$(Si_xTi_{1-x})O_2$—M wherein M represents at least one member selected from the group consisting of $Al_2O_3$ and $ZrO_2$, wherein the main component, the sub-component, and the oxide glass are contained in described amounts. The composition is used as dielectric materials, such as monolithic ceramic capacitors, using base metals such as nickel as an internal electrode material.

20 Claims, 1 Drawing Sheet

NON-REDUCED DIELECTRIC CERAMIC COMPOSITIONS

BACKGROUND OF THE INVENTION

1. Field of the Invention

The present invention relates to a non-reduced dielectric composition, which may be used for dielectric materials, such as monolithic ceramic capacitors, using base metals such as nickel as an internal electrode material.

2. Description of the Related Art

Conventional dielectric ceramic materials containing $BaTiO_3$ as a main component exhibit semiconductive properties when they are reduced as a result of firing under a neutral or reducing low oxygen partial pressure. Therefore, materials which do not melt at the high temperature at which the dielectric ceramic material is sintered, and which do not oxidize when fired under a high oxygen partial pressure and change the dielectric ceramic material to the semiconductor, for example noble metals such as palladium and platinum, must be used for the internal electrodes. Such problems significantly have hampered the low-cost production of the monolithic ceramic capacitors.

In order to solve the above problem, the use of base metals such as nickel, for example, has been required in internal electrode materials. When such base metals are used as internal electrode materials and fired under conventional conditions, the electrode materials become oxidized and do not accomplish the desired function as electrodes. For use with such base metals as internal electrode materials a dielectric ceramic material has been required which does not cause a change into a semiconductor state even when fired under a neutral or reducing low oxygen partial pressure, and which has the sufficient specific resistance and excellent dielectric characteristics of a dielectric material for a capacitor.

As dielectric ceramic materials satisfying the above conditions, for example, a $BaTiO_3$—$CaZrO_3$—$MnO$—$MgO$ composition in JP-A-62-256422, a $BaTiO_3$—$MnO$—$MgO$-rare earth metal oxide composition in JP-A-63-103861, and a $BaTiO_3$—(Mg, Zn, Sr, Ca)O+$Li_2O$—$SiO_2$—MO (wherein MO represents BaO, SrO, or CaO) in JP-B-61-14610 are proposed.

However, the non-reduced dielectric ceramic composition disclosed in JP-A-62-256422 tends to form different phases including $CaZrO_3$ and $CaTiO_3$ during firing step, and Mn.

In the non-reduced dielectric ceramic composition disclosed in JP-A-63-103861, the dependency of the insulation resistance and capacitance on temperature are significantly affected by the particle size of the main component, $BaTiO_3$, so that the process of obtaining stable characteristics is hard to control. Moreover, the product (CR) of the insulation resistance and electrostatic capacitance ranges from 1,000 to 2,000 ($\Omega \cdot F$).

Further, in the composition disclosed in JP-B-61-14610, the dielectric constant of the resulting dielectric ceramic ranges from 2,000 to 2,800, which is lower than that of conventional ceramic compositions using noble metals such as palladium, i.e., 3,000 to 3,500. Thus, the substitution of this composition for conventional materials, for the purpose of the cost reduction, is not favorable to the miniaturization of a capacitor with higher capacitance.

Although all of the non-reduced dielectric ceramic compositions, including the above-mentioned compositions, which have been proposed recently have higher insulation resistances at room temperature compared with conventional materials, the resistance tends to drastically decrease at a higher temperature. Therefore, the resistance against high temperature is low, and that causes difficulty in thinning of the dielectric substance, so no thin multilayer capacitor using a non-reduced dielectric ceramic composition has been realized. Further, conventional non-reduced dielectric ceramic compositions exhibit a low resistance against high humidity in comparison with conventional materials using palladium as the internal electrode.

The present inventors have proposed novel non-reduced dielectric ceramic compositions in JP-A-5-09066, JP-A-5-09067, and JP-A-5-09068 in order to solve the above problems. Demands for compositions having further excellent properties have increased depending on properties required in the market, in particular, at a high temperature and high humidity.

SUMMARY OF THE INVENTION

In accordance with the present invention, it is intended to provide a non-reduced dielectric ceramic composition applicable to thin layer use, which can be fired without a structural change to a semiconductor under a low oxygen partial pressure, which has a dielectric constant of 3,000 or more and insulation resistance 6,000 or more by CR product, and which has excellent resistance against high temperature and moisture. Further, in the ceramic composition of the present invention, the change of capacitance is fixed within ±15% over the range of −55° C. to 125° C. when the capacitance at 25° C. is set to the standard.

The non-reduced dielectric ceramic composition in accordance with the present invention is characterized in that the composition contains a main component including $BaTiO_3$, at least one rare earth metal oxide ($Re_2O_3$) selected from the group consisting of $Tb_2O_3$, $Dy_2O_3$, $Ho_2O_3$ and $Er_2O_3$, and $Co_2O_3$, wherein such constituents are contained in predetermined amounts in the main component, an sub-component including BaO, MnO, MgO, and at least one compound selected from the group consisting of NiO and $Al_2O_3$, and an oxide glass mainly containing $Li_2O$—$(Si_xTi_{1-x})O_2$—M, wherein M is at least one compound selected from the group consisting of $Al_2O_3$ and $ZrO_2$, and the range of X is $0.30 \leq X \leq 1.00$.

By mixing these compounds according to a predetermined formulation optimally selected, the non-reduced dielectric ceramic composition of the present invention can be fired without changing to a semiconductor structure even under a low oxygen partial pressure. The ceramic composition has a dielectric constant 3,000 or more and an insulation resistance of 6,000 or more expressed by CR. Further, the change of capacitance is satisfactorily minimized within ±15% over −55° C. to 125° C. when the capacitance at 25° C. is set to the standard that satisfies X7R characteristic defined in EIA. Moreover, the ceramic composition has excellent resistance against high temperature and moisture, and is applicable to thin layer use.

Accordingly, when the non-reduced dielectric ceramic composition of the present invention is used as a dielectric material for multilayer semiconductor capacitors, base metals such as nickel, can be used as an internal electrode material. Thus, a significant cost reduction in such capacitors can be achieved compared with capacitors using a noble metal, for example, palladium, without decreases in all the characteristics including resistance against high temperature and moisture.

Preferred contents of $BaTiO_3$, the rare earth metal oxide ($Re_2O_3$), and $Co_2O_3$ as main components in the non-reduced dielectric ceramic composition range from about 92.0 to 99.4 mole percent for $BaTiO_3$, about 0.3 to 4.0 mole percent for $Re_2O_3$, and about 0.3 to 4.0 mole percent for $Co_2O_3$ to total 100 mole percent of the main components. More preferably, the respective amounts are about 94.0 to 99.0%, about 0.5 to 2.5% and about 0.5 to 4.0%. It was experimentally confirmed that this composition achieves a high insulation resistance, high dielectric constant, and stability of capacitance over wide temperature range.

Since a content of $BaTiO_3$ of less than 92.0 mole percent causes the increased contents of the rare earth metal oxide and $Co_2O_3$ in the composition, the insulation resistance and dielectric constant unsatisfactorily decrease. On the other hand, when the $BaTiO_3$ content exceeds 99.4 mole percent, the addition of the rare earth metal oxide and $Co_2O_3$ has little effect, and the temperature-capacitance change at a high temperature near the Curie point drastically shifts toward the plus side.

The contents set forth above in the present invention may include other ranges in which high insulation resistance, high dielectric constant, stability of capacitance over the wire temperature renege are achieved.

The preferred content of BaO as the sub-component ranges from about 0.05 to 4.0 mole percent, more preferably about 0.05 to 3.0%, based on to 100 mole percent of the main components in the non-reduced dielectric ceramic composition. It was experimentally confirmed that this composition achieved a reduction of the dielectric loss tan $\delta$ and insulation resistance, and completeness of sintering. When the content is less than 0.05 mole percent, stable characteristics are not obtainable in a given sintering atmosphere resulting in the increase in tan $\delta$ and decrease in the insulation resistance. On the other hand, when the content exceeds 4.0 mole percent, the completeness of sintering decreases.

In the present invention, the sub-component content may include other ranges in which decrease of the dielectric loss tan $\delta$ and insulation resistance, and increase of completeness of sintering, are achieved.

Further, the preferred content of MnO as the sub-component ranges from about 0.05 to 2.0 mole percent, more preferably about 0.05 to 1.5%, based on 100 mole percent of the main components in the non-reduced dielectric ceramic composition. It was experimentally. confirmed that this composition achieved a decrease of insulation resistance, increase of resistance against high temperature and moisture. A MnO content of less than 0.05 mole percent causes an unsatisfactory decrease in the insulation resistance, whereas a content over 2.0 mole percent causes some decrease in the insulation resistance and shortening of mean time to failure (MTTF).

In the present invention, the content of the sub-component MnO may include other ranges in which the component achieve the decrease of insulation resistance, increase of resistance against high temperature and moisture.

Moreover, the preferred content of MgO as the sub-component ranges from about 0.5 to 5.0 mole percent, more preferably about 1.0 to 4.0%, based on 100 mole percent of the main components in the non-reduced dielectric ceramic composition. It was experimentally confirmed that this component achieved stability of capacitance within the wide temperature range, increase of dielectric constant, and decrease of insulation resistance. When the MgO content is less than 0.5 mole percent, the stability of capacitance over the wide temperature range is not guaranteed. In particular, the decrease of capacitance is large in the low temperature range. Further, the increase of insulation resistance is small. On the other hand, a content over 5.0 mole percent causes decreases in the dielectric constant and insulation resistance.

In the present invention, the content of the sub-component MgO may include other ranges in which the component achieve a decrease of insulation resistance, increase of resistance against high temperature and moisture.

Also, it is preferred that 0.3 to 3.0 mole percent of at least one of NiO and $Al_2O_3$ sub-components is present, more preferably about 0.5 to 2.0%, based on 100 mole percent of the main components in the non-reduced dielectric ceramic composition in accordance with present invention. By the addition of these component an increase of the insulation resistance and dielectric constant, and decrease of dielectric loss were achieved.

When adding less than 0.3 mole percent of these components, the insulation resistance decrease and MTTF is shortened since the resistance against reducing atmosphere decreases. On the other hand, a NiO addition exceeding 3.0 mole percent causes a decrease in the insulation resistance similar to MnO addition, and the $Al_2O_3$ addition over 3.0 mole percent causes a decreased insulation resistance due to the incompleteness of sintering with increased dielectric loss.

In the present invention, the content of the sub-components NiO and/or $Al_2O_3$ may include other ranges in which the component achieve the decrease of insulation resistance, increase of dielectric constant and decrease of dielectric loss.

In the non-reduced dielectric ceramic composition of the present invention, the alkaline metal oxide content, contained in the $BaTiO_3$ as impurities, is preferably about 0.04 weight percent or less, based on the experimental results on the increase in the dielectric constant. An alkaline metal oxide content over 0.04 weight percent in $BaTiO_3$ is impractical due to the decreased dielectric constant.

However, in the present invention, the content of the alkaline metal oxides may include other ranges in which the dielectric constant is increased.

Further, the present invention is characterized by that the non-reduced dielectric ceramic composition may also contain $BaZrO_3$ as an sub-component. By mixing such a component according to a predetermined formulation optimally decided, the non-reduced dielectric ceramic composition of the present invention can be fired without changing to a semiconductor structure even under a low oxygen partial pressure. The ceramic composition has a dielectric constant of 3,000 or more and insulation resistance of 7,000 or more expressed by CR. Further, the capacitance change is restricted within ±15% over −55° C. to 125° C. when the capacitance at 25° C. is set to the standard that satisfies X7R characteristic defined in EIA. Moreover, the ceramic composition has excellent resistance against high temperature and moisture, and is applicable to thin layer components.

Accordingly, when the non-reduced dielectric ceramic composition of the present invention is used as the dielectric material of multilayer semiconductor capacitors, base metals such as nickel can be used as an internal electrode material. Thus, significant cost reduction can be achieved in such capacitors, compared with capacitors using a noble metal, for example, palladium, without decreases of resistance against high temperature and moisture.

In the non-reduced dielectric ceramic composition of the present invention, about 0.3 to 4.0 mole percent of $BaZrO_3$ is preferably present, more preferably about 0.5 to 3.0%, based on 100 mole percent of main components comprising a given amount of $BaTiO_3$, at least one rare earth element ($Re_2O_3$) selected from the group consisting of $Tb_2O_3$, $Dy_2O_3$, $Ho_2O_3$, and $Er_2O_3$, and $Co_2O_3$, based on the experimental results on the increased insulation resistance, and stability of capacitance in the wide range of the temperature. A $BaZrO_3$ content of less than 0.3 mole percent causes less increase in the insulation resistance. On the other hand, a content over 4.0 mole percent causes the noticeable decrease of the capacitance at high temperature region, although the insulation resistance is further increased.

In the present invention, the content of the $BaZrO_3$ sub-component may include other ranges in which the component achieves an increase of insulation resistance and stability of capacitance in the wide temperature range.

The preferred content of oxide glass set forth above is about 0.5 to 2.5 weight percent per 100 weight percent of the above-mentioned sub-component, preferably about 0.5 to 2.0 wt % in the non-reduced dielectric ceramic composition of the present invention. It was experimentally confirmed that this content causes an increase of completeness of sintering, reducing resistance and dielectric constant. An oxide glass content of less than 0.5 weight percent decreases the completeness of sintering and little increase in the reducing resistance. A content exceeding 2.5 weight percent is impractical due to a decreased dielectric constant.

In the present invention, the glass oxide content may include other ranges in which the component achieves the completeness of sintering, high resistance against reduction and high dielectric constant.

The mole percent of the oxide glass is preferably included within the range of the hexagon, inclusive of sides, having vertices A(20,80,0), B(10, 80, 10), C(10, 70, 20), D(35, 40, 20), E(45, 45, 10), and F(45, 55, 0) expressed by the ternary diagram consisting of ($Li_2O$, $(Si_xTi_{1-x})O_2$, M), wherein $0.30 \leq X \leq 1.00$ in the composition on line F-A. It was experimentally confirmed that the oxide glass content caused the increase of completeness of sintering and increase of resistance against high temperature and moisture.

A composition out of the range set forth above causes an unsatisfactory decrease in completeness of sintering because the composition does not form glass even when quenched with iced water. Further, even if the composition is within the glass forming range set forth above, a composition corresponding to the line F-A where X=1.00 is not suitable since most characteristics are lost at a high temperature and high humidity. Moreover, an X of less than 0.3 does not form glass and thus decreases completeness of sintering.

However, in the present invention, such glass oxide content range may include other ranges in which the component achieves the completeness of sintering, high resistance against reduction and high dielectric constant.

DESCRIPTION OF THE PREFERRED EMBODIMENTS

Figure 1:
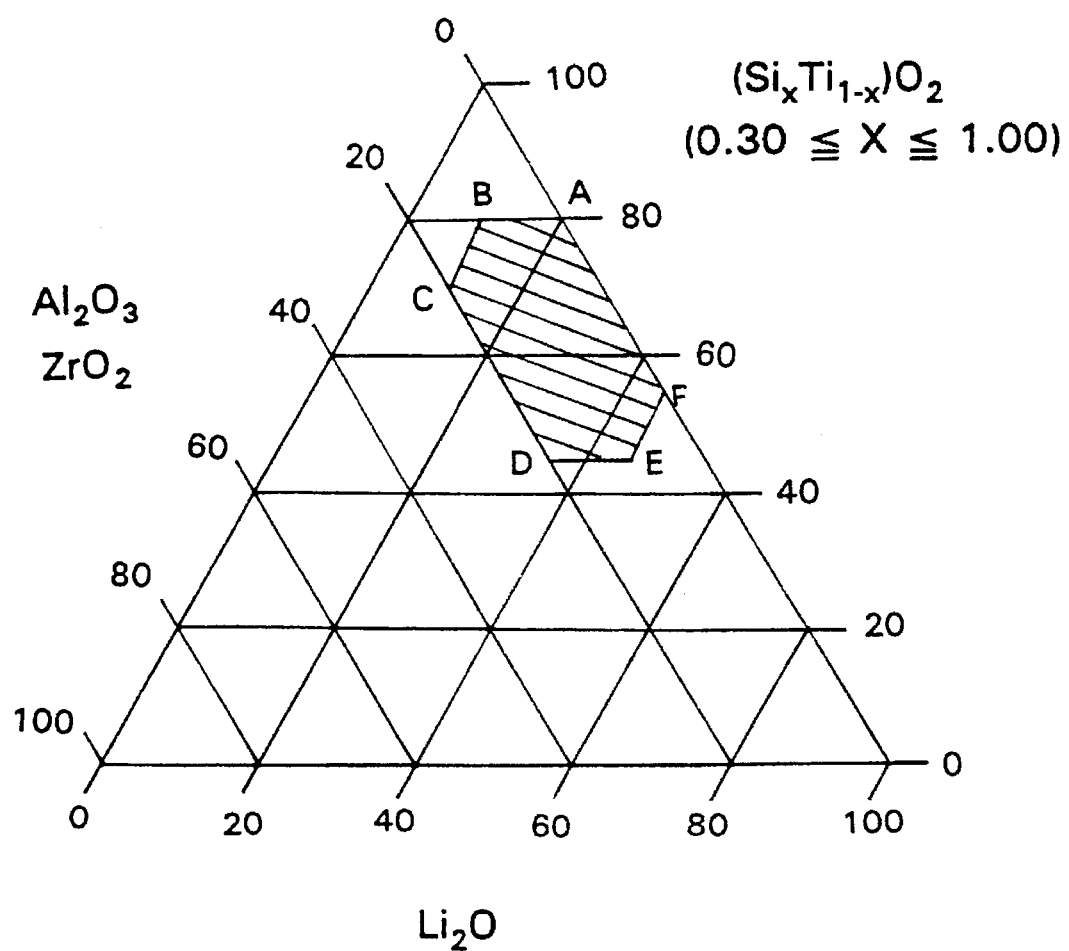
FIG. 1 is a ternary diagram consisting of $Li2O$—$(Si_xTi_{1-x})O_2$—M wherein M is at least one member selected from the group consisting of $Al_2O_3$ and $ZrO_2$.

The following non-limiting Examples illustrate the non-reduced dielectric ceramic composition in accordance with the present invention.

EXAMPLE 1

As starting materials, $BaTiO_3$ containing various levels of alkaline metal oxide impurities; $Tb_2O_3$, $Dy_2O_3$, $Ho_2O_3$ and $Er_2O_3$ as rare earth oxides ($Re_2O_3$); $Co_2O_3$; $BaCO_3$; $MnCO_3$; $MgO$; $NiO$ and $Al_2O_3$; and oxide glass were weighed so as to obtain the compositions shown in Tables 1 and 2, where $BaTiO_3$ containing 0.03 weight percent of alkaline metal oxides was used in each sample except for Sample Nos. 34 and 35 in which the alkaline metal oxide contents in the $BaTiO_3$ used were 0.05 and 0.07 weight percent, respectively.

TABLE 1

| Sample No. | $BaTiO_3$ (mol %) | $Re_2O_3$ | (mol %) | $Co_2O_3$ (mol %) | BaO (mol %) | MnO (mol %) | MgO (mol %) | $NiO,Al_2O_3$ | (mol %) | Glass (Wt. %) |
|---|---|---|---|---|---|---|---|---|---|---|
| 1 | 97.0 | $Dy_2O_3$ | 1.5 | 1.5 | 1.5 | 0.3 | 1.0 | NiO | 1.0 | 1.0 |
| 2 | 99.0 | $Dy_2O_3$ | 0.5 | 0.5 | 1.5 | 0.3 | 1.0 | NiO | 1.0 | 1.0 |
| 3* | 99.6 | $Dy_2O_3$ | 0.2 | 0.2 | 1.5 | 0.3 | 1.0 | NiO | 1.0 | 1.0 |
| 4* | 90.0 | $Dy_2O_3$ | 4.0 | 6.0 | 1.5 | 0.3 | 1.0 | NiO | 1.0 | 1.0 |
| 5 | 94.0 | $Dy_2O_3$ | 2.0 | 4.0 | 1.5 | 0.3 | 1.0 | NiO | 1.0 | 1.0 |
| 6 | 97.5 | $Ho_2O_3$ | 1.5 | 1.0 | 1.5 | 0.3 | 2.0 | NiO | 1.0 | 1.0 |
| 7 | 96.5 | $Ho_2O_3$ | 1.5 | 2.0 | 0.1 | 0.5 | 2.0 | $Al_2O_3$ | 1.0 | 1.0 |
| 8 | 96.5 | $Ho_2O_3$ | 1.5 | 2.0 | 0.05 | 0.5 | 2.0 | $Al_2O_3$ | 1.0 | 1.0 |
| 9* | 96.5 | $Ho_2O_3$ | 1.5 | 2.0 | 0.03 | 0.5 | 2.0 | $Al_2O_3$ | 1.0 | 1.0 |
| 10 | 96.5 | $Ho_2O_3$ | 1.5 | 2.0 | 3.0 | 0.5 | 2.0 | $Al_2O_3$ | 1.0 | 1.0 |
| 11 | 96.5 | $Ho_2O_3$ | 1.5 | 2.0 | 4.0 | 0.5 | 2.0 | $Al_2O_3$ | 1.0 | 1.0 |
| 12* | 96.5 | $Ho_2O_3$ | 1.5 | 2.0 | 5.0 | 0.5 | 2.0 | $Al_2O_3$ | 1.0 | 1.0 |
| 13 | 97.5 | $Tb_2O_3$ | 1.0 | 1.5 | 1.5 | 1.5 | 3.0 | NiO | 0.5 | 1.5 |
| 14 | 97.5 | $Tb_2O_3$ | 1.0 | 1.5 | 1.5 | 2.0 | 3.0 | NiO | 0.5 | 1.5 |
| 15* | 97.5 | $Tb_2O_3$ | 1.0 | 1.5 | 1.5 | 2.5 | 3.0 | NiO | 0.5 | 1.5 |
| 16 | 97.5 | $Tb_2O_3$ | 1.0 | 1.5 | 1.5 | 0.05 | 3.0 | NiO | 0.5 | 1.5 |
| 17* | 97.5 | $Tb_2O_3$ | 1.0 | 1.5 | 1.5 | 0.03 | 3.0 | NiO | 0.5 | 1.5 |
| 18* | 97.0 | $Er_2O_3$ | 1.5 | 1.5 | 1.5 | 0.5 | 2.5 | NiO | 0.2 | 1.5 |
| 19 | 97.0 | $Er_2O_3$ | 1.5 | 1.5 | 1.5 | 0.5 | 2.5 | NiO | 2.0 | 1.5 |
| 20 | 97.0 | $Er_2O_3$ | 1.5 | 1.5 | 1.5 | 0.5 | 2.5 | NiO | 3.0 | 1.5 |
| 21* | 97.0 | $Er_2O_3$ | 1.5 | 1.5 | 1.5 | 0.5 | 2.5 | NiO | 3.5 | 1.5 |
| 22* | 97.0 | $Er_2O_3$ | 1.5 | 1.5 | 1.5 | 0.5 | 2.5 | $Al_2O_3$ | 3.5 | 1.5 |
| 23 | 96.5 | $Er_2O_3$ | 1.5 | 1.5 | 1.5 | 0.5 | 2.0 | $Al_2O_3$ | 1.5 | 1.5 |
| 24* | 96.0 | $Dy_2O_3$ | 1.5 | 2.5 | 1.5 | 0.3 | 0.2 | $Al_2O_3$ | 1.5 | 2.0 |
| 25* | 96.0 | $Dy_2O_3$ | 1.5 | 1.5 | 1.5 | 0.3 | 0.4 | $Al_2O_3$ | 1.5 | 2.0 |

TABLE 2

| Sample No. | BaTiO₃ (mol %) | Re₂O₃ (mol %) | | Co₂O₃ (mol %) | BaO (mol %) | MnO (mol %) | MgO (mol %) | NiO,Al₂O₃ (mol %) | | Glass (Wt. %) |
|---|---|---|---|---|---|---|---|---|---|---|
| 26 | 96.0 | Dy₂O₃ | 1.5 | 2.5 | 1.5 | 0.3 | 3.0 | NiO | 1.5 | 2.0 |
| 27 | 96.0 | Dy₂O₃ | 1.5 | 2.5 | 1.5 | 0.3 | 4.0 | NiO | 1.5 | 2.0 |
| 28 | 96.0 | Dy₂O₃ | 1.5 | 2.5 | 1.5 | 0.3 | 5.0 | NiO | 1.5 | 2.0 |
| 29* | 96.0 | Dy₂O₃ | 1.5 | 2.5 | 1.5 | 0.3 | 6.0 | NiO | 1.5 | 2.0 |
| 30 | 96.5 | Ho₂O₃ | 2.0 | 1.5 | 1.5 | 0.5 | 2.0 | NiO | 1.0 | 2.5 |
| 31* | 96.5 | Ho₂O₃ | 2.0 | 1.5 | 1.5 | 0.5 | 2.0 | NiO | 1.0 | 3.0 |
| 32 | 96.5 | Ho₂O₃ | 2.0 | 1.5 | 1.5 | 0.5 | 2.0 | NiO | 1.0 | 0.5 |
| 33* | 96.5 | Ho₂O₃ | 2.0 | 1.5 | 1.5 | 0.5 | 2.0 | NiO | 1.0 | 0.3 |
| 34* | 97.0 | Dy₂O₃ | 1.5 | 1.5 | 1.5 | 0.3 | 1.0 | NiO | 1.0 | 1.0 |
| 35* | 97.0 | Dy₂O₃ | 1.5 | 1.5 | 1.5 | 0.3 | 1.0 | NiO | 1.0 | 1.0 |
| 36* | 97.0 | Tb₂O₃ | 1.0 | 2.0 | 1.5 | 0.5 | 2.0 | Al₂O₃ | 1.5 | 2.0 |
| 37* | 97.0 | Tb₂O₃ | 1.0 | 2.0 | 1.5 | 0.5 | 2.0 | Al₂O₃ | 1.5 | 2.0 |
| 38* | 97.0 | Tb₂O₃ | 1.0 | 2.0 | 1.5 | 0.5 | 2.0 | Al₂O₃ | 1.5 | 2.0 |
| 39* | 97.0 | Er₂O₃ | 1.0 | 2.0 | 1.5 | 0.5 | 2.0 | Al₂O₃ | 1.5 | 2.0 |
| 40* | 97.0 | Tb₂O₃ | 1.0 | 2.0 | 1.5 | 0.5 | 2.0 | Al₂O₃ | 1.5 | 2.0 |
| 41* | 97.0 | Er₂O₃ | 1.0 | 2.0 | 1.5 | 0.5 | 2.0 | Al₂O₃ | 1.5 | 2.0 |
| 42 | 97.0 | Er₂O₃ | 1.0 | 2.0 | 1.5 | 0.5 | 2.0 | Al₂O₃ | 1.5 | 2.0 |
| 43* | 97.0 | Er₂O₃ | 1.0 | 2.0 | 1.5 | 0.5 | 2.0 | Al₂O₃ | 1.5 | 2.0 |
| 44 | 97.0 | Er₂O₃ | 1.0 | 2.0 | 1.5 | 0.5 | 2.0 | Al₂O₃ | 1.5 | 2.0 |
| 45* | 97.0 | Er₂O₃ | 1.0 | 2.0 | 1.5 | 0.5 | 2.0 | Al₂O₃ | 1.5 | 2.0 |

In each sample, the oxide glass was prepared as follows:

First, $Li_2O$, $SiO_2$, $TiO_2$, $Al_2O_3$, and $ZrO_2$ were prepared as raw materials. After these raw materials were weighed so as to obtain compositions shown in Tables 3 and 4, pure water was added to the weighed materials. The materials were dispersed in water using a ball mill and PSZ balls. After removing the water to dryness, the powder mixture was placed into a platinum crucible and heated at 1400° C. for 15 minutes in a glass furnace. The melt was taken out from the crucible, and quenched in iced water to obtain a bulk glass. After the bulk glass was roughly crushed in a mortar, the crushed glass was thoroughly water-ground in the ball mill using PSZ and a dispersant. The glass powder was obtained by evaporating the dispersant to dryness.

TABLE 3

| Sample No. | $Li_2O$ (mol %) | $(Si_xTi_{1-x})O_2$ (mol %) | x (Mol Frac.) | M (mol %) | Al2O3 (mol %) | ZrO₂ (mol %) |
|---|---|---|---|---|---|---|
| 1 | 20 | 80 | 0.90 | 0 | — | — |
| 2 | 20 | 80 | 0.90 | 0 | — | — |
| 3 | 20 | 80 | 0.90 | 0 | — | — |
| 4 | 10 | 80 | 0.60 | 10 | 50 | 50 |
| 5 | 10 | 80 | 0.60 | 10 | 50 | 50 |
| 6 | 10 | 80 | 0.60 | 10 | 50 | 50 |
| 7 | 10 | 70 | 0.30 | 20 | 100 | 0 |
| 8 | 10 | 70 | 0.30 | 20 | 100 | 0 |
| 9 | 10 | 70 | 0.30 | 20 | 100 | 0 |
| 10 | 35 | 45 | 0.50 | 20 | 0 | 100 |
| 11 | 35 | 45 | 0.50 | 20 | 0 | 100 |
| 12 | 35 | 45 | 0.50 | 20 | 0 | 100 |
| 13 | 45 | 45 | 0.50 | 10 | 50 | 50 |
| 14 | 45 | 45 | 0.50 | 10 | 50 | 50 |
| 15 | 45 | 45 | 0.50 | 10 | 50 | 50 |
| 16 | 45 | 55 | 0.90 | 0 | — | — |
| 17 | 45 | 55 | 0.90 | 0 | — | — |
| 18 | 45 | 55 | 0.90 | 0 | — | — |
| 19 | 20 | 70 | 1.00 | 10 | 70 | 30 |
| 20 | 20 | 70 | 1.00 | 10 | 70 | 30 |
| 21 | 20 | 70 | 1.00 | 10 | 70 | 30 |
| 22 | 20 | 70 | 1.00 | 10 | 70 | 30 |
| 23 | 20 | 70 | 1.00 | 10 | 70 | 30 |
| 24 | 20 | 70 | 1.00 | 10 | 70 | 30 |
| 25 | 30 | 60 | 0.60 | 10 | 30 | 70 |

TABLE 4

| Sample No. | $Li_2O$ (mol %) | $(Si_xTi_{1-x})O_2$ (mol %) | x (Mol Frac.) | M (mol %) | Al2O3 (mol %) | ZrO₂ (mol %) |
|---|---|---|---|---|---|---|
| 26 | 30 | 60 | 0.60 | 10 | 30 | 70 |
| 27 | 30 | 60 | 0.60 | 10 | 30 | 70 |
| 28 | 30 | 60 | 0.60 | 10 | 30 | 70 |
| 29 | 30 | 60 | 0.60 | 10 | 30 | 70 |
| 30 | 30 | 60 | 0.60 | 10 | 30 | 70 |
| 31 | 40 | 50 | 0.30 | 10 | 50 | 50 |
| 32 | 40 | 50 | 0.30 | 10 | 50 | 50 |
| 33 | 40 | 50 | 0.30 | 10 | 50 | 50 |
| 34 | 40 | 50 | 0.30 | 10 | 50 | 50 |
| 35 | 40 | 50 | 0.30 | 10 | 50 | 50 |
| 36* | 40 | 50 | 0.20 | 10 | 50 | 50 |
| 37* | 10 | 85 | 0.90 | 5 | 50 | 50 |
| 38* | 5 | 75 | 0.90 | 20 | 50 | 50 |
| 39* | 20 | 55 | 0.90 | 25 | 50 | 50 |
| 40* | 45 | 40 | 0.90 | 15 | 50 | 50 |
| 41* | 50 | 45 | 0.90 | 5 | 50 | 50 |
| 42 | 25 | 75 | 0.90 | 0 | — | — |
| 43* | 25 | 75 | 1.00 | 0 | — | — |
| 44 | 35 | 65 | 0.90 | 0 | — | — |
| 45* | 35 | 65 | 1.00 | 0 | — | — |

The oxide glass prepared in such a way contains at least one component among $Li_2O$, $(Si_xTi_{1-x})O_2$ (wherein $0.30 \leq X \leq 1$), and M (wherein M represents $Al_2O_3$ and/or $ZrO_2$) as shown in a ternary diagram of FIG. 1. In FIG. 1, the shaded hexagonal portion represents the range of the present invention, wherein Points A (20, 80, 0), B(10, 80, 10), C(10, 70, 20), D(35, 45, 20), E(45, 45, 10), and F(45, 55, 0) represents vertices of the hexagon.

A raw slurry was prepared by dispersing and mixing each component shown in Tables 1 and 2 with a dispersant in the ball mill using PSZ balls. After adding an organic binder and plasticizer to the slurry, the mixture was thoroughly stirred. The mixture was shaped into a ceramic green sheet having a thickness of 12 mm by the doctor blade method.

A Ni conductive paste was screen-printed on a single side of the resulting ceramic green sheet to form an internal electrode. After drying, a plurality of ceramic green sheets were laminated and pressed in the vertical direction of the sheets to obtain a laminated product. Green ceramic units were prepared by cutting the laminated product into small pieces. After each green ceramic unit was held at 320° C. for 5 hours to remove the binder in the green ceramic unit, the unit was fired at the temperature shown in Tables 5 and 6 for 2 hours in a reducing $H_2/N_2$ mixed gas stream having a volume ratio of 3/100 in order to obtain a sintered dielectric element having a thickness of 8 mm.

temperature-capacitance change (TCC), and weatherability, i.e., registance against high temperature and moisture. The results are summarized in Tables 5 and 6. In each sample, 36 laminated ceramic capacitors were evaluated.

TABLE 5

| Sample No. | Firing Temp. (°C.) | Dielectric Constant ($e_{25}$) | Dielectric Loss tan δ (%) | Capacitance Change −55° C. | Capacitance Change +125° C. | Cmax | CR Product (Ω · F) | Units Damaged at High Temp | Units Damaged by moisture |
|---|---|---|---|---|---|---|---|---|---|
| 1 | 1,280 | 3,340 | 1.8 | −2.6 | −7.8 | 8.9 | 6,480 | 0/36 | 0/36 |
| 2 | 1,280 | 3,280 | 1.7 | −3.4 | −6.4 | 8.1 | 6,710 | 2/36 | 0/36 |
| 3* | 1,300 | 3,540 | 1.6 | −9.1 | +20.1 | 26.1 | 6,800 | 6/36 | 2/36 |
| 4* | 1,280 | 2,910 | 1.9 | −3.7 | −8.2 | 9.5 | 1,870 | 21/36 | 19/36 |
| 5 | 1,280 | 3,240 | 1.7 | −3.6 | −7.7 | 9.1 | 6,130 | 0/36 | 1/36 |
| 6 | 1,280 | 3,350 | 1.8 | −2.9 | −7.3 | 8.2 | 6,570 | 0/36 | 1/36 |
| 7 | 1,280 | 3,260 | 1.9 | −3.2 | −7.5 | 8.4 | 6,290 | 1/36 | 0/36 |
| 8 | 1,280 | 3,190 | 2.1 | −3.4 | −7.6 | 8.5 | 6,050 | 2/36 | 1/36 |
| 9* | 1,280 | 3,220 | 3.8 | −3.5 | −7.8 | 9.0 | 2,040 | 80 hrs | 110 hrs |
| 10 | 1,300 | 3,340 | 1.9 | −4.2 | −7.0 | 7.9 | 6,080 | 1/36 | 3/36 |
| 11 | 1,300 | 3,200 | 2.2 | −4.6 | −6.8 | 8.6 | 6,100 | 3/36 | 5/36 |
| 12* | Not measurable due to unsatisfactory sintering even at 1,360° C. | | | | | | | | |
| 13 | 1,280 | 3,250 | 1.8 | −4.9 | −6.1 | 7.5 | 6,810 | 0/36 | 0/36 |
| 14 | 1,280 | 3,210 | 1.7 | −5.2 | −5.8 | 7.1 | 6,360 | 4/36 | 2/36 |
| 15* | 1,260 | 3,020 | 2.3 | −5.6 | −5.1 | 6.8 | 2,340 | 210 hrs | 110 hrs |
| 16 | 1,280 | 3,280 | 1.8 | −4.4 | −8.4 | 9.5 | 6,480 | 3/36 | 5/36 |
| 17* | 1,280 | 3,260 | 4.6 | −4.8 | −9.2 | 10.1 | 1,880 | 80 hrs | 70 hrs |
| 18* | 1,280 | 3,100 | 3.2 | −3.9 | −7.7 | 8.8 | 3,800 | 270 hrs | 160 hrs |
| 19 | 1,280 | 3,230 | 1.8 | −3.8 | −7.5 | 8.4 | 6,340 | 1/36 | 2/36 |
| 20 | 1,280 | 3,340 | 1.9 | −3.8 | −7.9 | 8.7 | 6,180 | 4/36 | 6/36 |
| 21* | 1,280 | 3,440 | 2.0 | −3.6 | −8.2 | 9.0 | 3,200 | 380 hrs | 140 hrs |
| 22* | 1,320 | 2,780 | 2.8 | −2.6 | −5.7 | 6.8 | 4,080 | 240 hrs | 76 hrs |
| 23 | 1,280 | 3,380 | 1.8 | −3.1 | −7.5 | 8.7 | 6,600 | 2/36 | 3/36 |
| 24* | 1,260 | 3,140 | 1.8 | −18.6 | −13.1 | 18.6 | 3,400 | 30/36 | 26/36 |
| 25* | 1,260 | 3,300 | 1.8 | −12.6 | −9.8 | 12.6 | 4,830 | 12/36 | 8/36 |

TABLE 6

| Sample No. | Firing Temp. (°C.) | Dielectric Constant ($e_{25}$) | Dielectric Loss tan δ (%) | Capacitance Change −55° C. | Capacitance Change +125° C. | Cmax | CR Product (Ω · F) | Units Damaged at High Temp | Units Damaged by moisture |
|---|---|---|---|---|---|---|---|---|---|
| 26 | 1,260 | 3,290 | 1.9 | −5.1 | −6.8 | 8.0 | 6,690 | 0/36 | 1/36 |
| 27 | 1,260 | 3,210 | 1.8 | −5.4 | −6.6 | 7.9 | 7,080 | 2/36 | 2/36 |
| 28 | 1,280 | 3,110 | 1.7 | −5.6 | −6.4 | 8.0 | 7,130 | 2/36 | 3/36 |
| 29* | 1,280 | 2,840 | 1.9 | −6.1 | −5.1 | 7.0 | 3,800 | 290 hrs | 3/36 |
| 30 | 1,260 | 3,200 | 1.7 | −4.2 | −8.1 | 9.3 | 6,710 | 0/36 | 0/36 |
| 31* | 1,260 | 2,610 | 1.6 | −3.8 | −9.0 | 10.1 | 6,060 | 3/36 | 1/36 |
| 32 | 1,300 | 3,380 | 1.8 | −3.7 | −8.4 | 9.2 | 6,530 | 4/36 | 5/36 |
| 33* | 1,340 | 3,100 | 2.2 | −2.9 | −6.5 | 7.6 | 5,600 | 18/36 | 8/36 |
| 34* | 1,280 | 2,810 | 1.6 | −3.0 | −7.4 | 8.6 | 6,210 | 2/36 | 1/36 |
| 35* | 1,280 | 2,630 | 1.6 | −3.1 | −7.0 | 8.2 | 5,860 | 4/36 | 2/36 |
| 36* | Not measurable due to unsatisfactory sintering even at 1,360° C. | | | | | | | | |
| 37* | Not measurable due to unsatisfactory sintering even at 1,360° C. | | | | | | | | |
| 38* | Not measurable due to unsatisfactory sintering even at 1,360° C. | | | | | | | | |
| 39* | Not measurable due to unsatisfactory sintering even at 1,360° C. | | | | | | | | |
| 40* | Not measurable due to unsatisfactory sintering even at 1,360° C. | | | | | | | | |
| 41* | Not measurable due to unsatisfactory sintering even at 1,360° C. | | | | | | | | |
| 42 | 1,280 | 3,260 | 1.7 | −4.6 | −6.6 | 7.6 | 6,240 | 1/36 | 2/36 |
| 43* | 1,280 | 3,280 | 1.8 | −4.9 | −6.2 | 7.1 | 6,180 | 4/36 | 320 hrs |
| 44 | 1,300 | 3,340 | 1.8 | −4.0 | −7.5 | 8.8 | 6,480 | 2/36 | 2/36 |
| 45* | 1,300 | 3,320 | 1.9 | −4.2 | −7.2 | 8.6 | 6,290 | 5/36 | 280 hrs |

A laminated ceramic capacitor was made by applying a silver paste on the both end faces of the resulting sintered material and firing in air to form silver external electrodes. The laminated ceramic capacitor was evaluated by the following items: dielectric constant at a room temperature $\epsilon_{25}$, dielectric loss tan δ, insulation resistance (logIR), The dielectric constant $\epsilon_{25}$, and dielectric loss tan δ was measured at 25° C., frequency of 1 KHz, and alternating voltage of 1 V. The insulation resistance was expressed as the product (CR) of the electrostatic capacitance multiplied by the result which was obtained by applying 16 V of dc voltage for 2 minutes at 25° C. The temperature-capacitance change (TCC) was evaluated with the change rate of each capacitance at −55° C. and 125° C. to the standard electrostatic capacitance at 25° C., i.e. $\Delta C_{-55}/C_{25}$ and $\Delta C_{125}/C_{25}$, and the maximum change $|\Delta C/C_{25}|_{max}$ which is absolute value of the maximum temperature-capacitance change between −55° C. and 125° C.

Concerning the weatherability evaluations, resistance against high temperature was defined as the number of damaged samples after applying 64 V of dc voltage to 36 samples at 175 ° C. for 500 hours, and in the cases where all of the samples damaged within 500 hours, its MTTF was shown in Tables 5 and 6. The resistance against moisture was evaluated by the number of damaged samples after applying dc voltage of 16 V to 36 samples at a temperature of 121° C. and humidity of 100% for 250 hours. When all of the samples were damaged within 250 hours, its MTTF was shown in Tables 5 and 6.

Tables 5 and 6 show the noticeable effects of the thin layer laminated ceramic capacitor using the non-reduced dielectric ceramic composition in accordance with the present invention, which are in no way inferior to conventional products using palladium and the like as the internal electrode.

In the Examples, a sample number marked with an asterisk (*) has a composition deferring from the specified composition in the present invention, and is out of the range of the present invention.

Then, samples with asterisk (*) will be explained.

In sample No. 4, since the $BaTiO_3$ content is 90.0 mole percent, the rare earth metal oxides and $Co_2O_3$ contents are increased resulting in decreased insulation resistance and dielectric constant.

In sample No. 3, since the $BaTiO_3$ content is too high, i.e. 99.6 mole percent, there is no effect of the addition of rare earth metal oxides and $Co_2O_3$, and particularly, the capacitance change is significantly large at temperatures near the Curie point.

In sample No. 9 containing 0.03 mole percent of the BaO, the product characteristics become unstable in the firing atmosphere, resulting in the increased tan δ, and decreased insulation resistance.

Sample No. 12 containing 5.0 mole percent of BaO has incomplete sintering.

Sample No. 17 containing 0.03 mole percent of MnO has a decreased insulation resistance.

Sample 15 containing 2.5 mole percent of MnO has a shortened MTTF due to the slight decrease in the insulation resistance.

In sample Nos. 24 and 25 containing 0.2 mole percent and 0.4 mole percent of MgO, respectively, the low MgO contents do not effectively flatten the temperature-capacitance change curve, and in particular, tend to exhibit large capacitance change at the lower temperature region. Further, the insulation resistance does not noticeably increase.

In sample No. 29 containing 6.0 mole percent of MgO, the dielectric constant and insulation resistance are decreased.

In sample No. 18 containing only 0.2 mole percent of NiO, since the non-reduced properties of the texture is almost not improved, the insulation resistance is decreased and the MTTF is shortened.

In sample No. 21 containing 3.5 mole percent of NiO, the insulation resistance decreases.

In sample No. 22 containing 3.5 mole percent of $Al_2O_3$, the dielectric constant decreases with increased dielectric loss due to the decrease in sintering characteristics.

In sample Nos. 34 and 35 in which the alkaline metal oxide contents as impurities in $BaTiO_3$ are 0.05 and 0.07 weight percent, respectively, the dielectric constant decreases.

In sample No. 33, the oxide glass content of 0.3 weight percent causes a decrease in completeness of sintering and very little improvement in resistance against a non-reducing atmosphere.

In sample No. 31, the oxide glass content of 3.0 weight percent causes a decrease in the dielectric constant.

In sample Nos. 37 through 41, since these compositions are out of the range expressed by the hexagon formed by six points, i.e., A, B, C, D, E, and F in the ternary diagram shown in FIG. 1, the samples mostly lost transparency without changing into a glass after quenching in iced water, and this causes the decreased completeness of sintering.

Although sample Nos. 43 and 45 are included in the range expressed by the above-mentioned hexagon, these compositions are on line F-A and at the same time, X=1.00. Thus, these samples show significantly bad characteristics at a high temperature or high humidity.

In sample No. 36, since X equals to 0.20, the sample mostly lost transparency without changing into a glass. Thus, the sintering characteristics decreased in this sample.

The present invention is not limited to such a Example, and it is to be understood that modifications will be apparent to those skilled in the art without departing from the scope of the invention. For example, various sub-components can be added into the composition of the present invention without losing the above-mentioned characteristics.

EXAMPLE 2

As starting materials, $BaTiO_3$ containing various levels of alkaline metal oxide impurities; $Tb_2O_3$, $Dy_2O_3$, $Ho_2O_3$ and $Er_2O_3$ as rare earth oxides ($Re_2O_3$); $Co_2O_3$; $BaCO_3$; $MnCO_3$; MgO; NiO and $Al_2O_3$; $BaZrO_3$ and oxide glass were weighed so as to obtain the compositions shown in Tables 7 and 8. $BaTiO_3$ containing 0.03 weight percent of alkaline metal oxides was used in each sample except for Sample Nos. 40 and 41 in which the alkaline metal oxide contents in $BaTiO_3$ used were 0.05 and 0.07 weight percent, respectively.

TABLE 7

| Sample No. | $BaTiO_3$ (mol %) | $Re_2O_3$ (mol %) | | $Co_2O_3$ (mol %) | BaO (mol %) | MnO (mol %) | MgO (mol %) | $NiO,Al_2O_3$ (mol %) | | $BaZrO_3$ (mol %) | Glass (Wt. %) |
|---|---|---|---|---|---|---|---|---|---|---|---|
| 1 | 97.0 | $Dy_2O_3$ | 1.5 | 1.5 | 1.5 | 0.3 | 1.0 | NiO | 1.0 | 1.0 | 1.0 |
| 2 | 99.0 | $Dy_2O_3$ | 0.5 | 0.5 | 1.5 | 0.3 | 1.0 | NiO | 1.0 | 1.0 | 1.0 |
| 3* | 99.6 | $Dy_2O_3$ | 0.2 | 0.2 | 1.5 | 0.3 | 1.0 | NiO | 1.0 | 1.0 | 1.0 |
| 4* | 90.0 | $Dy_2O_3$ | 4.0 | 6.0 | 1.5 | 0.3 | 1.0 | NiO | 1.0 | 1.0 | 1.0 |
| 5 | 94.0 | $Dy_2O_3$ | 2.0 | 4.0 | 1.5 | 0.3 | 1.0 | NiO | 1.0 | 1.0 | 1.0 |
| 6 | 97.5 | $Ho_2O_3$ | 1.5 | 1.0 | 1.5 | 0.3 | 2.0 | NiO | 1.0 | 1.0 | 1.0 |
| 7 | 96.5 | $Ho_2O_3$ | 1.5 | 2.0 | 0.1 | 0.5 | 2.0 | $Al_2O_3$ | 1.0 | 1.0 | 1.0 |
| 8 | 96.5 | $Ho_2O_3$ | 1.5 | 2.0 | 0.05 | 0.5 | 2.0 | $Al_2O_3$ | 1.0 | 1.0 | 1.0 |

TABLE 7-continued

| Sample No. | BaTiO$_3$ (mol %) | Re$_2$O$_3$ (mol %) | | Co$_2$O$_3$ (mol %) | BaO (mol %) | MnO (mol %) | MgO (mol %) | NiO,Al$_2$O$_3$ (mol %) | | BaZrO$_3$ (mol %) | Glass (Wt. %) |
|---|---|---|---|---|---|---|---|---|---|---|---|
| 9* | 96.5 | Ho$_2$O$_3$ | 1.5 | 2.0 | 0.03 | 0.5 | 2.0 | Al$_2$O$_3$ | 1.0 | 1.0 | 1.0 |
| 10 | 96.5 | Ho$_2$O$_3$ | 1.5 | 2.0 | 3.0 | 0.5 | 2.0 | Al$_2$O$_3$ | 1.0 | 1.0 | 1.0 |
| 11 | 96.5 | Ho$_2$O$_3$ | 1.5 | 2.0 | 4.0 | 0.5 | 2.0 | Al$_2$O$_3$ | 1.0 | 1.0 | 1.0 |
| 12* | 96.5 | Ho$_2$O$_3$ | 1.5 | 2.0 | 5.0 | 0.5 | 2.0 | Al$_2$O$_3$ | 1.0 | 1.0 | 1.0 |
| 13 | 97.5 | Tb$_2$O$_3$ | 1.0 | 1.5 | 1.5 | 1.5 | 3.0 | NiO | 0.5 | 2.0 | 1.5 |
| 14 | 97.5 | Tb$_2$O$_3$ | 1.0 | 1.5 | 1.5 | 2.0 | 3.0 | NiO | 0.5 | 2.0 | 1.5 |
| 15* | 97.5 | Tb$_2$O$_3$ | 1.0 | 1.5 | 1.5 | 2.5 | 3.0 | NiO | 0.5 | 2.0 | 1.5 |
| 16 | 97.5 | Tb$_2$O$_3$ | 1.0 | 1.5 | 1.5 | 0.05 | 3.0 | NiO | 0.5 | 2.0 | 1.5 |
| 17* | 97.5 | Tb$_2$O$_3$ | 1.0 | 1.5 | 1.5 | 0.03 | 3.0 | NiO | 0.5 | 2.0 | 1.5 |
| 18* | 97.0 | Er$_2$O$_3$ | 1.5 | 1.5 | 1.5 | 0.5 | 2.5 | NiO | 0.2 | 2.0 | 1.5 |
| 19 | 97.0 | Er$_2$O$_3$ | 1.5 | 1.5 | 1.5 | 0.5 | 2.5 | NiO | 2.0 | 2.0 | 1.5 |
| 20 | 97.0 | Er$_2$O$_3$ | 1.5 | 1.5 | 1.5 | 0.5 | 2.5 | NiO | 3.0 | 2.0 | 1.5 |
| 21* | 97.0 | Er$_2$O$_3$ | 1.5 | 1.5 | 1.5 | 0.5 | 2.5 | NiO | 3.5 | 2.0 | 1.5 |
| 22* | 97.0 | Er$_2$O$_3$ | 1.5 | 1.5 | 1.5 | 0.5 | 2.5 | Al$_2$O$_3$ | 3.5 | 2.0 | 1.5 |
| 23 | 96.5 | Er$_2$O$_3$ | 1.5 | 1.5 | 1.5 | 0.5 | 2.0 | Al$_2$O$_3$ | 1.5 | 2.0 | 1.5 |
| 24* | 96.0 | Dy$_2$O$_3$ | 1.5 | 2.5 | 1.5 | 0.3 | 0.2 | Al$_2$O$_3$ | 1.5 | 2.0 | 2.0 |
| 25* | 96.0 | Dy$_2$O$_3$ | 1.5 | 2.5 | 1.5 | 0.3 | 0.4 | Al$_2$O$_3$ | 1.5 | 2.0 | 2.0 |
| 26 | 96.0 | Dy$_2$O$_3$ | 1.5 | 2.5 | 1.5 | 0.3 | 3.0 | NiO | 1.5 | 2.0 | 2.0 |
| 27 | 96.0 | Dy$_2$O$_3$ | 1.5 | 2.5 | 1.5 | 0.3 | 4.0 | NiO | 1.5 | 2.0 | 2.0 |
| 28 | 96.0 | Dy$_2$O$_3$ | 1.5 | 2.5 | 1.5 | 0.3 | 5.0 | NiO | 1.5 | 2.0 | 2.0 |
| 29* | 96.0 | Dy$_2$O$_3$ | 1.5 | 2.5 | 1.5 | 0.3 | 6.0 | NiO | 1.5 | 2.0 | 2.0 |
| 30 | 96.5 | Ho$_2$O$_3$ | 2.0 | 1.5 | 1.5 | 0.5 | 2.0 | NiO | 1.0 | 2.0 | 2.5 |

TABLE 8

| Sample No. | BaTiO$_3$ (mol %) | Re$_2$O$_3$ (mol %) | | Co$_2$O$_3$ (mol %) | BaO (mol %) | MnO (mol %) | MgO (mol %) | NiO,Al$_2$O$_3$ (mol %) | | BaZrO$_3$ (mol %) | Glass (Wt. %) |
|---|---|---|---|---|---|---|---|---|---|---|---|
| 31* | 96.5 | Ho$_2$O$_3$ | 2.0 | 1.5 | 1.5 | 0.5 | 2.0 | NiO | 1.0 | 2.0 | 3.0 |
| 32 | 96.5 | Ho$_2$O$_3$ | 2.0 | 1.5 | 1.5 | 0.5 | 2.0 | NiO | 1.0 | 2.0 | 0.5 |
| 33* | 96.5 | Ho$_2$O$_3$ | 2.0 | 1.5 | 1.5 | 0.5 | 2.0 | NiO | 1.0 | 2.0 | 0.3 |
| 34 | 97.0 | Tb$_2$O$_3$ | 2.5 | 1.0 | 1.0 | 0.5 | 1.5 | Al$_2$O$_3$ | 1.5 | 3.0 | 1.5 |
| 35 | 97.0 | Tb$_2$O$_3$ | 2.5 | 1.0 | 1.0 | 0.5 | 1.5 | Al$_2$O$_3$ | 1.5 | 4.0 | 1.5 |
| 36* | 97.0 | Tb$_2$O$_3$ | 2.5 | 1.0 | 1.0 | 0.5 | 1.5 | Al$_2$O$_3$ | 1.5 | 5.0 | 1.5 |
| 37 | 97.0 | Tb$_2$O$_3$ | 2.5 | 1.0 | 1.0 | 0.5 | 1.5 | Al$_2$O$_3$ | 1.5 | 0.5 | 1.5 |
| 38 | 97.0 | Tb$_2$O$_3$ | 2.5 | 1.0 | 1.0 | 0.5 | 1.5 | Al$_2$O$_3$ | 1.5 | 0.3 | 1.5 |
| 39* | 97.0 | Tb$_2$O$_3$ | 2.5 | 1.0 | 1.0 | 0.5 | 1.5 | Al$_2$O$_3$ | 1.5 | 0.1 | 1.5 |
| 40* | 97.0 | Dy$_2$O$_3$ | 1.5 | 1.5 | 1.5 | 0.3 | 1.0 | NiO | 1.0 | 1.0 | 1.0 |
| 41* | 97.0 | Dy$_2$O$_3$ | 1.5 | 1.5 | 1.5 | 0.3 | 1.0 | NiO | 1.0 | 1.0 | 1.0 |
| 42* | 97.0 | Tb$_2$O$_3$ | 1.0 | 2.0 | 1.5 | 0.5 | 2.0 | Al$_2$O$_3$ | 1.5 | 1.5 | 2.0 |
| 43* | 97.0 | Tb$_2$O$_3$ | 1.0 | 2.0 | 1.5 | 0.5 | 2.0 | Al$_2$O$_3$ | 1.5 | 1.5 | 2.0 |
| 44* | 97.0 | Tb$_2$O$_3$ | 1.0 | 2.0 | 1.5 | 0.5 | 2.0 | Al$_2$O$_3$ | 1.5 | 1.5 | 2.0 |
| 45* | 97.0 | Tb$_2$O$_3$ | 1.0 | 2.0 | 1.5 | 0.5 | 2.0 | Al$_2$O$_3$ | 1.5 | 1.5 | 2.0 |
| 46* | 97.0 | Tb$_2$O$_3$ | 1.0 | 2.0 | 1.5 | 0.5 | 2.0 | Al$_2$O$_3$ | 1.5 | 1.5 | 2.0 |
| 47* | 97.0 | Er$_2$O$_3$ | 1.0 | 2.0 | 1.5 | 0.5 | 2.0 | Al$_2$O$_3$ | 1.5 | 1.5 | 2.0 |
| 48 | 97.0 | Er$_2$O$_3$ | 1.0 | 2.0 | 1.5 | 0.5 | 2.0 | Al$_2$O$_3$ | 1.5 | 1.5 | 2.0 |
| 49* | 97.0 | Er$_2$O$_3$ | 1.0 | 2.0 | 1.5 | 0.5 | 2.0 | Al$_2$O$_3$ | 1.5 | 1.5 | 2.0 |
| 50 | 97.0 | Er$_2$O$_3$ | 1.0 | 2.0 | 1.5 | 0.5 | 2.0 | Al$_2$O$_3$ | 1.5 | 1.5 | 2.0 |
| 51* | 97.0 | Er$_2$O$_3$ | 1.0 | 2.0 | 1.5 | 0.5 | 2.0 | Al$_2$O$_3$ | 1.5 | 1.5 | 2.0 |

In each sample, an oxide glass was prepared as follows:

First, Li$_2$O, SiO$_2$, TiO$_2$, Al$_2$O$_3$, and ZrO$_2$ were prepared as raw materials. After these raw materials were weighed so as to obtain the compositions shown in Tables 9 and 10, pure water was added to the weighed materials. The materials with water were dispersed in a ball mill using PSZ balls. After removing the water to dryness, the powder mixture was placed into a platinum crucible and heated at 1400° C. for 15 minutes in a glass furnace. The melt was taken out from the crucible, and quenched in iced water to obtain a bulk glass. After the bulk glass was roughly crushed in a mortar, the crushed glass was thoroughly water-ground in the ball mill using PSZ and a dispersant. The glass powder was obtained by evaporating the dispersant to dryness.

TABLE 9

| Sample No. | Li$_2$O (mol %) | (Si$_x$Ti$_{1-x}$)O$_2$ (mol %) | x (mol %) | M (mol %) | Al$_2$O$_3$ (mol %) | ZrO$_2$ (mol %) |
|---|---|---|---|---|---|---|
| 1 | 20 | 80 | 0.90 | 0 | — | — |
| 2 | 20 | 80 | 0.90 | 0 | — | — |
| 3 | 20 | 80 | 0.90 | 0 | — | — |
| 4 | 10 | 80 | 0.60 | 10 | 50 | 50 |
| 5 | 10 | 80 | 0.60 | 10 | 50 | 50 |
| 6 | 10 | 80 | 0.60 | 10 | 50 | 50 |
| 7 | 10 | 70 | 0.30 | 20 | 100 | 0 |
| 8 | 10 | 70 | 0.30 | 20 | 100 | 0 |
| 9 | 10 | 70 | 0.30 | 20 | 100 | 0 |
| 10 | 35 | 45 | 0.50 | 20 | 0 | 100 |
| 11 | 35 | 45 | 0.50 | 20 | 0 | 100 |

TABLE 9-continued

| Sample No. | Li$_2$O (mol %) | (Si$_x$Ti$_{1-x}$)O$_2$ (mol %) | x | M (mol %) | Al$_2$O$_3$ (mol %) | ZrO$_2$ (mol %) |
|---|---|---|---|---|---|---|
| 12 | 35 | 45 | 0.50 | 20 | 0 | 100 |
| 13 | 45 | 45 | 0.50 | 10 | 50 | 50 |
| 14 | 45 | 45 | 0.50 | 10 | 50 | 50 |
| 15 | 45 | 45 | 0.50 | 10 | 50 | 50 |
| 16 | 45 | 55 | 0.90 | 0 | — | — |
| 17 | 45 | 55 | 0.90 | 0 | — | — |
| 18 | 45 | 55 | 0.90 | 0 | — | — |
| 19 | 20 | 75 | 0.60 | 5 | 70 | 30 |
| 20 | 20 | 75 | 0.60 | 5 | 70 | 30 |
| 21 | 20 | 75 | 0.60 | 5 | 70 | 30 |
| 22 | 20 | 75 | 0.60 | 5 | 70 | 30 |
| 23 | 15 | 70 | 0.60 | 15 | 30 | 70 |
| 24 | 15 | 70 | 0.60 | 15 | 30 | 70 |
| 25 | 15 | 70 | 0.60 | 15 | 30 | 70 |
| 26 | 15 | 70 | 0.60 | 15 | 30 | 70 |
| 27 | 30 | 65 | 0.40 | 5 | 50 | 50 |
| 28 | 30 | 65 | 0.40 | 5 | 50 | 50 |
| 29 | 30 | 65 | 0.40 | 5 | 50 | 50 |
| 30 | 30 | 65 | 0.40 | 5 | 50 | 50 |

TABLE 10

| Sample No. | Li$_2$O (mol %) | (Si$_x$Ti$_{1-x}$)O$_2$ (mol %) | x | M (mol %) | Al$_2$O$_3$ (mol %) | ZrO$_2$ (mol %) |
|---|---|---|---|---|---|---|
| 31 | 25 | 50 | 0.40 | 15 | 50 | 50 |
| 32 | 25 | 50 | 0.40 | 15 | 50 | 50 |
| 33 | 25 | 50 | 0.40 | 15 | 50 | 50 |
| 34 | 25 | 50 | 0.40 | 15 | 50 | 50 |
| 35 | 40 | 50 | 1.00 | 5 | 100 | 0 |
| 36 | 40 | 50 | 1.00 | 5 | 100 | 0 |
| 37 | 40 | 85 | 1.00 | 5 | 100 | 0 |
| 38 | 40 | 75 | 1.00 | 5 | 100 | 0 |
| 39 | 35 | 55 | 0.30 | 15 | 0 | 100 |
| 40 | 35 | 40 | 0.30 | 15 | 0 | 100 |
| 41 | 35 | 45 | 0.30 | 15 | 0 | 100 |
| 42* | 35 | 75 | 0.20 | 15 | 0 | 100 |
| 43* | 10 | 75 | 0.90 | 5 | 50 | 50 |
| 44* | 5 | 65 | 0.90 | 20 | 50 | 50 |
| 45* | 20 | 65 | 0.90 | 25 | 50 | 50 |
| 46* | 45 | 40 | 0.90 | 15 | 50 | 50 |
| 47* | 50 | 45 | 0.90 | 5 | 50 | 50 |
| 48 | 25 | 75 | 0.90 | 0 | — | — |
| 49* | 25 | 75 | 1.00 | 0 | — | — |
| 50 | 35 | 65 | 0.90 | 0 | — | — |
| 51* | 35 | 65 | 1.00 | 0 | — | — |

The oxide glass prepared in such a way contains at least one component among Li$_2$O, (Si$_x$Ti$_{1-x}$)O$_2$ (wherein 0.30≦X≦1), and M (wherein M represents Al$_2$O$_3$ and/or ZrO$_2$) as shown in a ternary diagram of FIG. 1. In FIG. 1, the shaded hexagonal portion represents the range of the present invention, wherein Points A (20, 80, 0), B(10, 80, 10), C(10, 70, 20), D(35, 45, 20), E(45, 45, 10), and F(45, 55, 0) represents vertices of the hexagon.

A Ni conductive paste was screen-printed on a single side of the resulting ceramic green sheet to form an internal electrode. After drying, a plurality of ceramic green sheets were laminated and pressed in the vertical direction of the sheets to obtain a laminated product. Green ceramic units were prepared by cutting the laminated product into small pieces. After each green ceramic unit was held at 320° C. for 5 hours to remove the binder in the green ceramic unit, the unit was fired at the temperature shown in Tables 11 and 12 for 2 hours in a reducing H$_2$/N$_2$ mixed gas stream having a volume ratio of 3/100 in order to obtain a sintered dielectric element having a thickness of 8 mm.

TABLE 11

| Sample No. | Firing Temp. (°C.) | Dielectric Constant (e$_{25}$) | Dielectric Loss tan δ (%) | Capacitance Change | | | CR Product (Ω · F) | Units damaged at High Temp. | Units damaged by moisture |
|---|---|---|---|---|---|---|---|---|---|
| | | | | −55° C. | +125° C. | Cmax | | | |
| 1 | 1,280 | 3,290 | 1.7 | −2.8 | −8.1 | 9.0 | 7,180 | 0/36 | 0/36 |
| 2 | 1,280 | 3,240 | 1.7 | −3.4 | −6.9 | 8.6 | 7,210 | 3/36 | 1/36 |
| 3* | 1,300 | 3,560 | 1.8 | −8.8 | +19.6 | 25.1 | 7,400 | 6/36 | 8/36 |
| 4* | 1,280 | 2,880 | 1.8 | −4.0 | −8.5 | 9.7 | 2,270 | 23/36 | 16/36 |
| 5 | 1,280 | 3,160 | 1.6 | −3.8 | −7.9 | 9.3 | 7,130 | 2/36 | 1/36 |
| 6 | 1,280 | 3,210 | 1.7 | −3.1 | −7.4 | 8.5 | 7,870 | 0/36 | 1/36 |
| 7 | 1,280 | 3,310 | 2.0 | −3.4 | −7.9 | 9.1 | 7,490 | 1/36 | 0/36 |
| 8 | 1,280 | 3,390 | 2.2 | −3.7 | −8.1 | 9.5 | 7,250 | 2/36 | 1/36 |
| 9* | 1,280 | 3,420 | 3.9 | −3.8 | −8.4 | 9.5 | 2,900 | 100 hrs | 130 hrs |
| 10 | 1,300 | 3,280 | 1.8 | −4.4 | −6.9 | 7.7 | 7,310 | 3/36 | 2/36 |
| 11 | 1,300 | 3,120 | 2.2 | −4.7 | −6.5 | 7.2 | 7,100 | 2/36 | 6/36 |
| 12* | | | Not measurable due to unsatisfactory sintering even at 1,360° C. | | | | | | |
| 13 | 1,280 | 3,280 | 1.8 | −5.1 | −6.4 | 7.8 | 7,810 | 0/36 | 0/36 |
| 14 | 1,280 | 3,190 | 1.6 | −5.5 | −5.4 | 6.9 | 7,490 | 3/36 | 1/36 |

TABLE 11-continued

| Sample No. | Firing Temp. (°C.) | Dielectric Constant ($\epsilon_{25}$) | Dielectric Loss tan $\delta$ (%) | Capacitance Change -55° C. | Capacitance Change +125° C. | Cmax | CR Product ($\Omega \cdot F$) | Units damaged at High Temp. | Units damaged by moisture |
|---|---|---|---|---|---|---|---|---|---|
| 15* | 1,260 | 3,020 | 2.6 | −5.9 | −4.8 | 5.9 | 2,940 | 240 hrs | 130 hrs |
| 16 | 1,280 | 3,320 | 1.9 | −4.4 | −7.9 | 9.1 | 7,280 | 6/36 | 4/36 |
| 17* | 1,280 | 3,390 | 4.8 | −4.1 | −9.2 | 10.3 | 2,180 | 110 hrs | 90 hrs |
| 18* | 1,280 | 3,140 | 3.1 | −4.3 | −7.4 | 8.6 | 4,200 | 290 hrs | 180 hrs |
| 19 | 1,280 | 3,230 | 1.7 | −4.1 | −7.6 | 8.9 | 7,140 | 3/36 | 1/36 |
| 20 | 1,280 | 3,360 | 1.8 | −4.1 | −8.1 | 9.0 | 7,280 | 5/36 | 3/36 |
| 21* | 1,280 | 3,420 | 2.1 | −4.3 | −8.6 | 9.6 | 3,600 | 370 hrs | 160 hrs |
| 22* | 1,320 | 2,690 | 2.9 | −3.1 | −5.4 | 6.5 | 5,180 | 260 hrs | 90 hrs |
| 23 | 1,280 | 3,350 | 1.7 | −3.5 | −7.8 | 8.9 | 7,600 | 3/36 | 3/36 |
| 24* | 1,260 | 3,410 | 1.8 | −16.8 | −15.1 | 19.6 | 4,400 | 25/36 | 19/36 |
| 25* | 1,260 | 3,330 | 1.7 | −13.1 | −10.5 | 13.7 | 5,230 | 11/36 | 7/36 |
| 26 | 1,260 | 3,210 | 1.8 | −5.4 | −7.2 | 8.3 | 7,290 | 0/36 | 1/36 |
| 27 | 1,260 | 3,190 | 1.7 | −5.5 | −6.9 | 7.9 | 7,480 | 2/36 | 3/36 |
| 28 | 1,280 | 3,090 | 1.6 | −5.7 | −6.6 | 8.1 | 7,630 | 3/36 | 5/36 |
| 29* | 1,280 | 2,810 | 1.9 | −6.3 | −5.3 | 7.2 | 4,800 | 220 hrs | 8/36 |
| 30 | 1,260 | 3,130 | 1.6 | −4.2 | −8.4 | 9.5 | 7,710 | 0/36 | 0/36 |

TABLE 12

| Sample No. | Firing Temp. (°C.) | Dielectric Constant ($\epsilon_{25}$) | Dielectric Loss tan $\delta$ (%) | Capacitance Change -55° C. | Capacitance Change +125° C. | Cmax | CR Product ($\Omega \cdot F$) | Units damaged at High Temp. | Units damaged by moisture |
|---|---|---|---|---|---|---|---|---|---|
| 31* | 1,260 | 2,700 | 1.5 | −4.5 | −9.3 | 10.2 | 7,160 | 2/36 | 0/36 |
| 32 | 1,300 | 3,410 | 1.8 | −4.2 | −8.2 | 9.2 | 7,530 | 4/36 | 6/36 |
| 33* | 1,340 | 3,010 | 2.5 | −4.6 | −6.9 | 7.8 | 5,200 | 12/36 | 18/36 |
| 34 | 1,280 | 3,380 | 1.8 | −3.3 | −9.7 | 10.5 | 8,100 | 3/36 | 3/36 |
| 35 | 1,280 | 3,320 | 1.8 | −2.8 | −10.8 | 11.6 | 8,620 | 0/36 | 4/36 |
| 36* | 1,280 | 3,280 | 1.7 | +0.6 | −15.8 | 15.8 | 9,650 | 2/36 | 3/36 |
| 37 | 1,280 | 3,410 | 1.8 | −3.8 | −7.7 | 8.6 | 7,820 | 2/36 | 1/36 |
| 38 | 1,280 | 3,360 | 1.7 | −4.0 | −7.4 | 8.4 | 7,320 | 3/36 | 2/36 |
| 39* | 1,280 | 3,430 | 1.9 | −4.2 | −7.3 | 8.1 | 6,040 | 1/36 | 2/36 |
| 40* | 1,280 | 2,760 | 1.6 | −2.7 | −7.7 | 8.9 | 5,810 | 3/36 | 0/36 |
| 41* | 1,280 | 2,590 | 1.4 | −3.1 | −7.4 | 8.5 | 4,960 | 4/36 | 2/36 |
| 42* | Not measurable due to unsatisfactory sintering even at 1,360° C. | | | | | | | | |
| 43* | Not measurable due to unsatisfactory sintering even at 1,360° C. | | | | | | | | |
| 44* | Not measurable due to unsatisfactory sintering even at 1,360° C. | | | | | | | | |
| 45* | Not measurable due to unsatisfactory sintering even at 1,360° C. | | | | | | | | |
| 46* | Not measurable due to unsatisfactory sintering even at 1,360° C. | | | | | | | | |
| 47* | Not measurable due to unsatisfactory sintering even at 1,360° C. | | | | | | | | |
| 48 | 1,280 | 3,280 | 1.7 | −4.2 | −7.4 | 8.6 | 7,420 | 2/36 | 3/36 |
| 49* | 1,280 | 3,310 | 1.8 | −4.2 | −7.0 | 8.4 | 7,180 | 6/36 | 270 hrs |
| 50 | 1,300 | 3,340 | 1.7 | −4.2 | −6.7 | 7.9 | 7,540 | 2/36 | 3/36 |
| 51* | 1,300 | 3,370 | 1.8 | −4.2 | −6.4 | 7.7 | 7,460 | 4/36 | 230 hrs |

A laminated ceramic capacitor was made by coating a silver paste on the both end faces of the resulting sintered material and firing in air to form silver external electrodes. The laminated ceramic capacitor was evaluated by the following items: dielectric constant at a room temperature $\epsilon_{25}$, dielectric loss tan $\delta$, insulation resistance (logIR), temperature-capacitance change (TCC), and resistance against high temperature and moisture. The results are summarized in Tables 11 and 12. In each sample, 36 laminated ceramic capacitors were evaluated.

The dielectric constant $\epsilon_{25}$, and dielectric loss tan $\delta$ was measured at 25° C., frequency of 1 KHz, and alternating voltage of 1 V. The insulation resistance was expressed as the product (CR) of the electrostatic capacitance multiplied by the result which was obtained by applying dc voltage of 16 V for 2 minutes at 25° C. The temperature-capacitance change (TCC) was evaluated with the percentage of change of each capacitance at −55° C. and 125° C. to the standard electrostatic capacitance at 25° C., i.e. $|\Delta C_{-55}/C_{25}|$ and $\Delta C_{125}/C_{25}$, and the maximum change $|\Delta C/C_{25}|_{max}$ which is absolute value of the maximum temperature-capacitance change between −55° C. and 125° C.

The resistance against a high temperature was defined as the number of failed samples after applying 64 V of dc voltage to 36 samples at 175° C. for 500 hours, and when all of the samples damaged within 500 hours, its MTTF was shown in Tables 11 and 12. The resistance against moisture was evaluated by the number of damaged samples after applying 16 V of dc voltage to 36 samples at a temperature of 121° C. and humidity of 100% for 250 hours. When all of the samples damaged within 250 hours, its MTTF was also shown in Tables 11 and 12.

Tables 11 and 12 show the noticeable effects of the thin layer laminated ceramic capacitor using the non-reduced dielectric ceramic composition in accordance with the present invention, which are in no way inferior to conventional products using palladium and the like as the internal electrode.

In Examples, a sample number with asterisk (*) has a composition deferring from the specified composition in the present invention, and is out of the range of the present invention.

Then, samples with asterisk (*) will be explained.

In sample No. 4, since the BaTiO$_3$ content is 90.0 mole percent, the rare earth metal oxides and Co$_2$O$_3$ contents are increased resulting in decreased insulation resistance and dielectric constant.

In sample No. 3, since the BaTiO$_3$ is an excessive 99.6 mole percent, there is no effect of the addition of rare earth metal oxides and Co$_2$O$_3$, and particularly, the capacitance change is significantly large in the temperature range near the Curie point.

In sample No. 9 containing 0.03 mole percent of the BaO, product characteristics become unstable in the firing atmosphere, resulting in the increased tan δ and decreased insulation resistance.

Sample No. 12 containing 5.0 mole percent of BaO exhibits a decrease in completeness of sintering.

Sample No. 17 containing 0.03 mole percent of MnO exhibits a decrease in the insulation resistance.

Sample 15 containing 2.5 mole percent of MnO exhibits a shortened MTTF due to the slight decrease in the insulation resistance.

In sample Nos. 24 and 25 containing 0.2 mole percent and 0.4 mole percent of MgO, respectively, such low MgO contents do not effectively flatten the temperature-capacitance change curve, and in particular, tend to exhibit a large change in capacitance at a lower temperature region. Further, the insulation resistance does not noticeably increase.

In sample No. 29 containing 6.0 mole percent of MgO, the dielectric constant and insulation resistance are decreased.

In sample No. 18 containing only 0.2 mole percent of NiO, since non-reduced properties of the texture is almost not improved, the insulation resistance is decreased and the MTTF is shortened.

In sample No. 21 containing 3.5 mole percent of NiO, the insulation resistance decreases.

In sample No. 22 containing 3.5 mole percent of Al$_2$O$_3$, the dielectric constant decreases with the increased dielectric loss due to the decrease in completeness of sintering.

In sample Nos. 40 and 41 in which the alkaline metal oxide content as impurities in BaTiO$_3$ are 0.05 and 0.07 weight percent, respectively, the dielectric constant decreases.

In sample No. 39 in which 0.1 mole percent of BaZrO$_3$ is added, the insulation resistance does not so satisfactory increase.

In sample No. 36 in which 5.0 mole percent of BaZrO$_2$ is added, although the insulation resistance further increases, the capacitance is significantly changed at a higher temperature region.

In sample No. 33, the oxide glass content of 0.3 weight percent causes the decrease in completeness of sintering and very little improvement in the non-reduced property.

In sample No. 31, the oxide glass content of 3.0 weight percent causes the decrease in the dielectric constant.

In sample Nos. 43 through 47, since these compositions are out of the range expressed by the hexagon formed by the six points A, B, C, D, E, and F in the ternary diagram shown in FIG. 1, most of the samples lost transparency without changing into a glass after quenching in iced water, and caused a decrease of completeness of sintering.

Although sample Nos. 49 and 51 are included in the range expressed by the above-mentioned hexagon, these compositions are on line F-A and at the same time X=1.00. These samples show significantly bad characteristics at high temperature or high humidity.

In sample No. 42, since X equals to 0.20, most of the sample lost its transparency without changing into a glass. Thus, the sintering characteristics decreased in this sample.

The present invention is not limited to such a Example, and it is to be understood that modifications will be apparent to those skilled in the art without departing from the scope of the invention. For example, various sub-components can be added into the composition of the present invention without losing the above-mentioned characteristics.

What is claimed is:

1. A non-reduced dielectric ceramic composition comprising:

a main component comprising BaTiO$_3$; at least one rare earth metal oxide (Re$_2$O$_3$) selected from the group consisting of Tb$_2$O$_3$, Dy$_2$O$_3$, Ho$_2$O$_3$, and Er$_2$O$_3$; and Co$_2$O$_3$;

an sub-component comprising BaO, MnO, MgO, and at least one compound selected from the group consisting of NiO and Al$_2$O$_3$; and an oxide glass consisting essentially of Li$_2$O—(Si$_x$Ti$_{1-x}$)O$_2$—M wherein M represents at least one member selected from the group consisting of Al$_2$O$_3$ and ZrO$_2$ and X is from 0.3 to 1.

2. A non-reduced dielectric ceramic composition according to claim 1, wherein the said main component comprises about 92.0 to 99.4 mole percent of said BaTiO$_3$, about 0.3 to 4.0 mole percent of said Re$_2$O$_3$; and about 0.3 to 4.0 mole percent of said Co$_2$O$_3$, of the total 100 mole percent of said main component.

3. A non-reduced dielectric ceramic composition according to claim 1, wherein about 0.05 to 4.0 mole percent of said BaO as said sub-component is present per 100 mole percent of said main component.

4. A non-reduced dielectric ceramic composition according to claim 1, wherein about 0.05 to 2.0 mole percent of said MnO as said sub-component is present per 100 mole percent of said main component.

5. A non-reduced dielectric ceramic composition according to claim 1, wherein about 0.05 to 5.0 mole percent of said MgO as said sub-component is present per 100 mole percent of said main component.

6. A non-reduced dielectric ceramic composition according to claim 1, wherein about 0.3 to 3.0 mole percent of at least one member as said sub-component selected from a group consisting of said NiO and Al$_2$O$_3$ is present per 100 mole percent of said main component.

7. A non-reduced dielectric ceramic composition according to claim 1, wherein said BaTiO$_3$ contains 0.04 weight percent or less of an alkaline metal oxide as an impurity.

8. A non-reduced dielectric ceramic composition according to claim 1, wherein said composition also contains BaZrO$_3$ as sub-component.

9. A non-reduced dielectric ceramic composition according to claim 8, wherein about 0.3 to 4.0 mole percent of said BaZrO$_3$ is present per 100 mole percent of said main component.

10. A non-reduced dielectric ceramic composition according to claim 1, wherein about 0.5 to 2.5 weight percent of said oxide glass is present based on the weight of said sub-component.

11. A non-reduced dielectric ceramic composition according to claim 1, wherein the mole percent of said oxide glass constituents are within a hexagon having the following vertices in a ternary diagram comprising $Li_2O$—$(Si_xTi_{1-x})O_2$—M:

A (20, 80, 0),

B (10, 80, 10),

C (10, 70, 20),

D (35, 45, 20),

E (45, 45, 10), and

F (45, 45, 0);

with the privoso that when the composition falls on the line F-A, X≠1.

12. A non-reduced dielectric ceramic composition according to claim 2, containing about 0.05 to 4.0 mole percent of said BaO per 100 mole percent of said main component, about 0.05 to 2.0 mole percent of said MnO per 100 mole percent of said main component, about 0.05 to 5.0 mole percent of said MgO per 100 mole percent of said main component, about 0.3 to 3.0 mole percent of said at least one member as said sub-component selected from a group consisting of said NiO and $Al_2O_3$ per 100 mole percent of said main component, about 0.5 to 2.5 weight percent of said oxide glass based on the weight of said sub-component in which the mole percent of said oxide glass constituents are within a hexagon having the following vertices in a ternary diagram comprising $Li_2O$—$(Si_xTi_{1-x})O_2$—M: A (20, 80, 0); B (10, 80, 10); C (10, 70, 20); D (35, 45, 20); E (45, 45, 10), and F (45, 45, 0) with the privoso that when the composition falls on the line F-A, X≠1, and wherein said $BaTiO_3$ contains 0.04 weight percent or less of an alkaline metal oxide as an impurity.

13. A non-reduced dielectric ceramic composition according to claim 12, in which the said main component comprises about 94 to 99 mole percent of said $BaTiO_3$, about 0.5 to 2 mole percent of said $Re_2O_3$; and about 1.5 to 2.5 mole percent of said $Co_2O_3$, of the total 100 mole percent of said main component about 0.1 to 3 mole percent of said BaO per 100 mole percent of said main component, about 0.3 to 1.5 mole percent of said MnO per 100 mole percent of said main component, about 1 to 3 mole percent of said MgO per 100 mole percent of said main component, about 1 to 2 mole percent of said at least one member as said sub-component selected from a group consisting of said NiO and $Al_2O_3$ per 100 mole percent of said main component, about 0.5 to 2.5 weight percent of said oxide glass based on the weight of said sub-component, and wherein said $BaTiO_3$ contains 0.004 weight percent or less of an alkaline metal oxide as an impurity.

14. A non-reduced dielectric ceramic composition according to claim 13, wherein said composition also contains $BaZrO_3$ as sub-component in an amount of about 0.3 to 4.0 mole percent of said $BaZrO_3$ per 100 mole percent of said main component.

15. In an electrical component comprising a conductor and non-reduced dielectric ceramic composition, the improvement which comprising utilizing the non-reduced dielectric ceramic composition of claim 1.

16. In an electrical component comprising a conductor and non-reduced dielectric ceramic composition, the improvement which comprising utilizing the non-reduced dielectric ceramic composition of claim 8.

17. In an electrical component comprising a conductor and non-reduced dielectric ceramic composition, the improvement which comprising utilizing the non-reduced dielectric ceramic composition of claim 11.

18. In an electrical component comprising a conductor and non-reduced dielectric ceramic composition, the improvement which comprising utilizing the non-reduced dielectric ceramic composition of claim 12.

19. In an electrical component comprising a conductor and non-reduced dielectric ceramic composition, the improvement which comprising utilizing the non-reduced dielectric ceramic composition of claim 13.

20. In an electrical component comprising a conductor and non-reduced dielectric ceramic composition, the improvement which comprising utilizing the non-reduced dielectric ceramic composition of claim 14.

* * * * *